F. M. ENGLISH.
CHURN.

No. 116940.

Patented Jul 11 1871.

Witnesses.
A. Ruppert.
J. W. Master.

Inventor.
F. M. English
Per Edson Brothers
Attys.

UNITED STATES PATENT OFFICE.

FRANCIS MARION ENGLISH, OF EVANSVILLE, INDIANA.

IMPROVEMENT IN CHURNS.

Specification forming part of Letters Patent No. 116,940, dated July 11, 1871.

*To all whom it may concern:*

Be it known that I, FRANCIS MARION ENGLISH, of Evansville, in the county of Vanderburg and State of Indiana, have invented a certain new and useful Improvement in Churns; and I do hereby declare the following to be a full, clear, and exact description thereof, reference being had to the accompanying drawing forming a part of the same, and in which—

Figure 1:
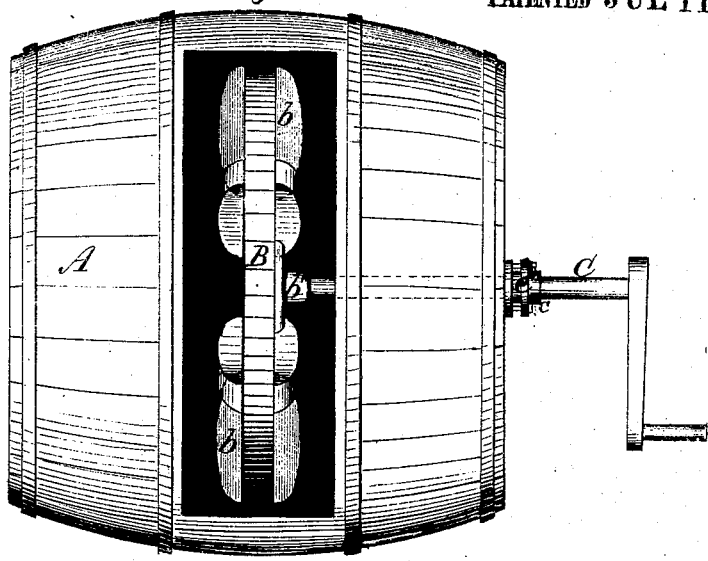
Figure 2:
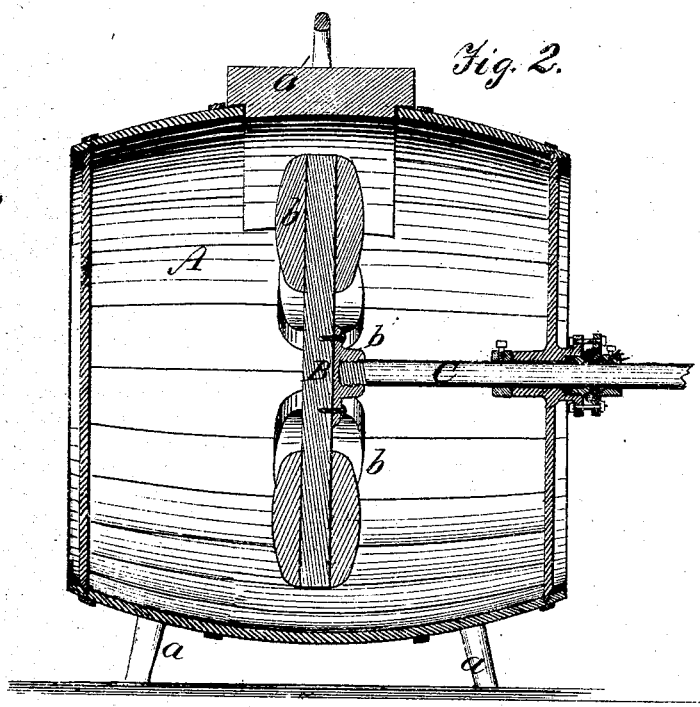
Figure 3:
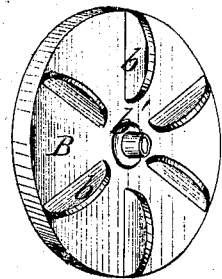

Figure 1 represents a plan view of my churn with its top removed, exhibiting an edge view of the dasher contained therein. Fig. 2 is a longitudinal central section thereof, with its top in place; and Fig. 3 represents a perspective view view of the dasher detached from the receptacle of the churn.

Similar letters of reference in the several figures indicate corresponding parts.

This invention refers to an improved churn; and it consists of the construction and arrangement of the constituent parts of the same, substantially as hereinafter set forth and claimed.

To enable those skilled in the art to which my invention appertains to make and use the same, I will proceed to describe its construction and operation.

In the annexed drawing, A designates a receptacle or keg-like case for the reception of the milk or cream to be converted into butter, which is mounted and secured longitudinally upon legs *a a*, and supplied with an opening with a cover or lid, *a*, through which the butter, after churning, is removed from A. B refers to the dasher, which consists preferably of a disk, to each side of which is suitably fastened, edgewise, a series of paddles or boards, *b b*, of the form shown in the figures of the annexed drawing, and arranged radially with reference to the center of the said disk, as plainly shown in Fig. 3. To one side of the dasher B, at its center, is screwed or otherwise fastened thereto a collar, *b*, furnished with a screw upon its inner surface for the reception of the screw formed upon one end of the horizontal dasher-staff C, the object of which being for the purpose of attaching and detaching the said staff when desired. C refers to the dasher-staff, connected at one end to the dasher B, as above set forth, and having its bearing in a journal-box rigidly secured in one end of the receptacle A, as plainly shown in Fig. 2. This shaft or staff is prevented from having lateral movement, while being revolved, by means of collars with set-screws located upon said shaft, as it will be seen by referring to Fig. 2. When the said collars are so arranged upon the said shaft as to come in contact with the inner and outer extremities of the journal-box through which said shaft passes, and thus held by their set-screws, the said shaft will be prevented from sliding while revolving. In order to prevent the contents of the receptacle from escaping while the latter is in motion, at the point where the dasher-staff or shaft passes through it, I supply the journal-box of the staff or shaft with any suitable packing extending around the periphery of said shaft, and held thereon by a collar, *c*, which has an annular flange formed upon it for screws, which fasten it to the flanged portion of the journal-box of the shaft or staff C, as seen in Fig. 2. The outer end of the dasher-staff or shaft is supplied with a crank or handle for operating the same.

Having thus described my invention, what I claim, and desire to secure by Letters Patent, is—

The dasher B, constructed of a disk having a series of paddles or boards, *b b*, of a curvilinear form, and arranged radially upon said disk with reference to its center, substantially as herein shown and described.

In testimony that I claim the foregoing as my invention I have hereunto signed my name this 6th day of March, A. D. 1871, in presence of two subscribing witnesses.

FRANCIS MARION ENGLISH.

Witnesses:
BEN. C. ALLIN,
C. E. TERRY.